United States Patent
Weihsmann

(10) Patent No.: US 6,891,291 B1
(45) Date of Patent: May 10, 2005

(54) FAN FOR ELECTRIC MACHINE

(75) Inventor: Peter R. Weihsmann, Fort Smith, AR (US)

(73) Assignee: Baldor Electric Company, Fort Smith, AR (US)

( * ) Notice: Subject to any disclaimer, the term of this patent is extended or adjusted under 35 U.S.C. 154(b) by 131 days.

(21) Appl. No.: 10/241,176

(22) Filed: Sep. 11, 2002

(51) Int. Cl.[7] .............................................. H02K 9/00
(52) U.S. Cl. ......................................... 310/62; 310/63
(58) Field of Search ....................... 310/62–63, 50–59, 310/60 R, 261

(56) References Cited

U.S. PATENT DOCUMENTS

| | | |
|---|---|---|
| 1,820,404 A | 8/1931 | Suter |
| 4,115,030 A | 9/1978 | Inagaki et al. |
| 4,184,804 A | 1/1980 | Inagaki et al. |
| 4,492,885 A | 1/1985 | Kitamura et al. |
| 4,670,677 A | 6/1987 | Snider et al. |
| 4,827,166 A * | 5/1989 | Morrill ........................ 310/88 |
| 5,021,696 A * | 6/1991 | Nelson ........................ 310/62 |
| 5,144,175 A | 9/1992 | Craggs |
| 5,757,094 A * | 5/1998 | van Duyn .................... 310/58 |
| 6,011,331 A | 1/2000 | Gierer et al. |
| 6,023,112 A | 2/2000 | Asao |
| 6,130,491 A | 10/2000 | Mitamura |

* cited by examiner

Primary Examiner—Thanh Lam
(74) Attorney, Agent, or Firm—Wood, Phillips, Katz, Clark & Mortimer

(57) ABSTRACT

A fan for an electrical machine having discrete fan blades mounted for rotation with the machine rotor. Each blade has a unitary mounting plate and is secured to the machine rotor or to a carrier on the rotor shaft. The preferred blade has a concave surface facing axially of the rotor in one direction and a convex surface facing axially of the rotor in the other direction. The concave/convex surfaces are formed by two flat triangular surfaces joined along a common edge. The triangular structure is fatigue resistant, reducing, the likelihood of mechanical failure.

14 Claims, 3 Drawing Sheets

FAN FOR ELECTRIC MACHINE

BACKGROUND OF THE INVENTION

Rotary electrical machines, as motors or generators, often incorporate a fan mounted on the rotor shaft to circulate air through the machine, cooling the electrical conductors and magnetic structure. Typically, the fans are stamped from metal as in Inagaki, U.S. Pat. Nos. 4,115,030 and 4,184,804, or molded as a unitary article from plastic, see Snider, U.S. Pat. No. 4,670,677. Such fans require expensive tooling.

A fan has been proposed having blades formed as discrete elements which are secured to the periphery of a carrier mounted on the rotor shaft of the machine or secured directly to the rotor itself. The blades may, for example, be molded from plastic. More particularly, the blade may be a simple panel, for example, mounted radially on the rotor. One form of such blade is a flat rectangular plate with a corner secured to a mounting plate at a joint, the blade extending at a right angle to the mounting plate. This blade is prone to fatigue failure at the joint because of its low natural frequency of vibration. The problem is partially relieved by the addition of a gusset.

BRIEF SUMMARY OF THE INVENTION

The invention is concerned with a fan blade which has concave and convex surfaces facing axially on the rotor and tapered radially and axially outward toward a tip remote from the rotor axis. The blade has a higher natural frequency of vibration and resists fatigue failure.

More particularly, the blade preferably comprises two triangular panels joined along a common edge and defining an axially directed angle with the common edge as a vertex. The blade is tapered radially and axially from a base facing inwardly of the rotor to a tip remote therefrom.

Further features and advantages of the fan blade will be apparent from the drawings and the detailed description.

Figure 1:
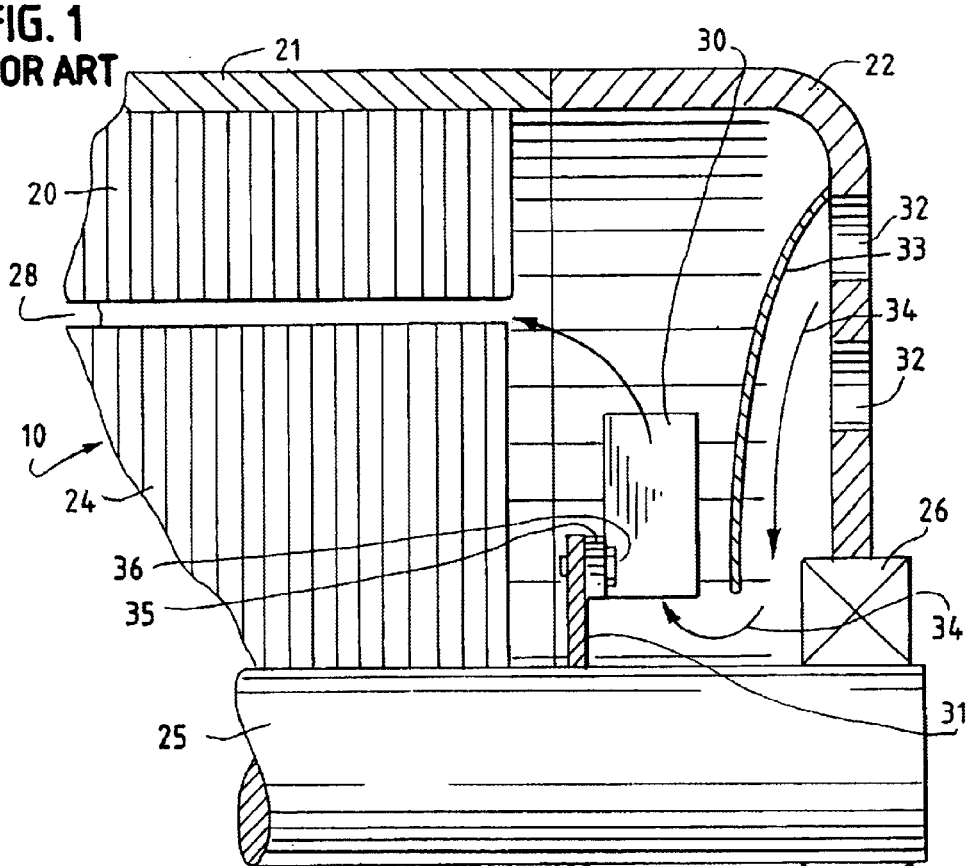
FIG. 1 is a fragmentary, sectional diagrammatic view of an electrical machine with a fan comprised of a plurality of prior art blades.

An electrical machine 10, FIG. 1, has a stator 20 surrounded by an outer shell 21. An end cap 22 is fitted to the shell and closes the end of the machine. A rotor 24 is mounted on an axial shaft 25 which is journaled in bearing 26 mounted in end cap 22. An annular gap 28 separates stator 20 from rotor 24. The stator and rotor are shown diagrammatically as stacks of laminations. Windings are not shown to avoid unnecessary complexity in the drawings.

Air is caused to flow through the machine by a prior art centrifugal fan comprised of discrete radial blades 30 secured to and extending radially outward from the periphery of a carrier 31 mounted on shaft 25. Alternatively, the discrete fan blades may be secured directly to rotor 24. The fan causes a flow of air in through end cap openings 32, around baffle 33, through annular gap 28 and across the stator 20 and rotor 24 as shown by arrows 34.

Figure 2:
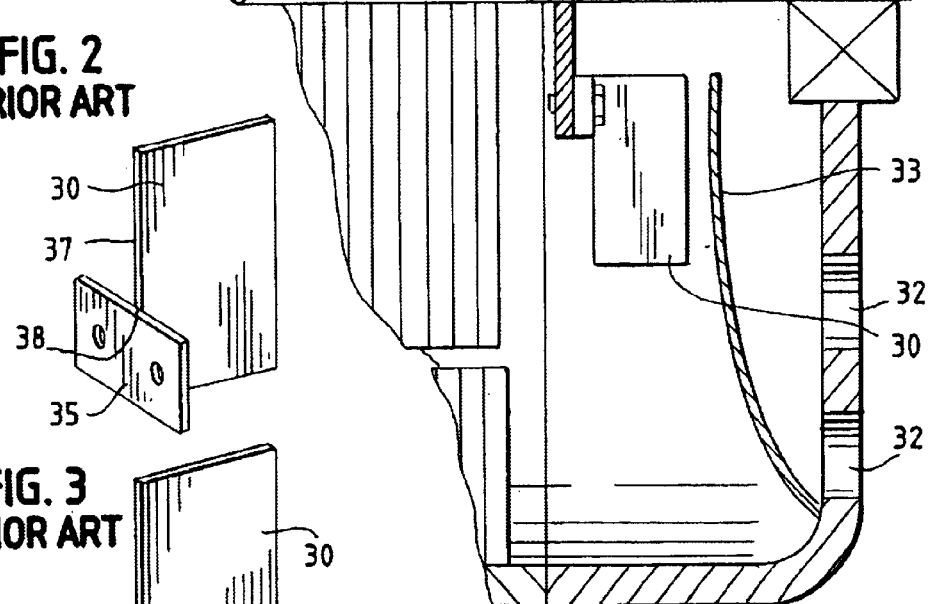
FIG. 2 is a perspective view of the fan blade of FIG. 1.

Radial blades 30 are flat rectangular plates with a major axis extending radially of the rotor and a minor axis extending axially of the rotor. Blade 30 has a mounting plate 35 which is secured to carrier 31 as by screws 36. A radially inner corner of blade 30 along radial edge 37 is joined with mounting plate 35 at joint 38, FIG. 2. As noted above, this blade construction is subject to fatigue failure of the joint 38.

Figure 3:
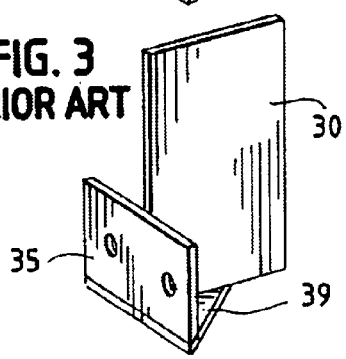
FIG. 3 is a perspective view of another prior art fan blade.

Joint 38 is strengthened by a gusset 39 extending between an edge of mounting plate 35 and the inner axial edge 40 of blade 30, FIG. 3, but still suffers from fatigue failure.

DETAILED DESCRIPTION OF THE INVENTION

Figure 4:
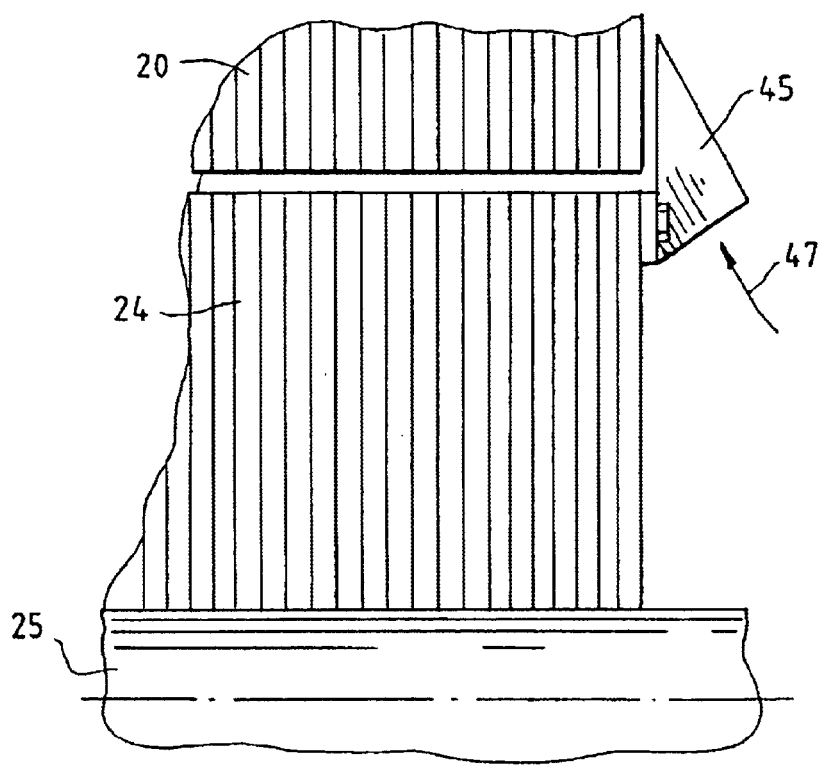
FIG. 4 is a fragmentary, sectional diagrammatic view of an electrical machine with a preferred fan blade.
Figure 5:
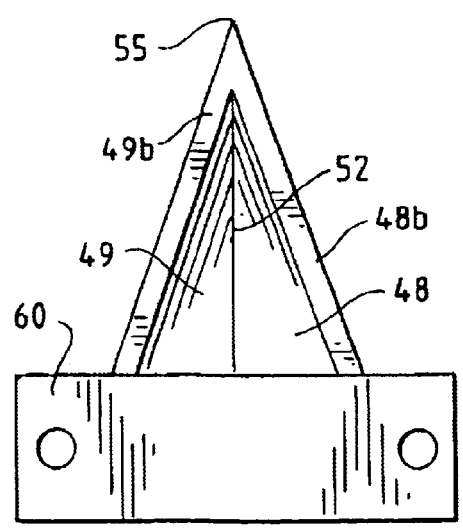
FIG. 5 is an axial view of the concave surface of the fan blade of FIG. 4.
Figure 6:
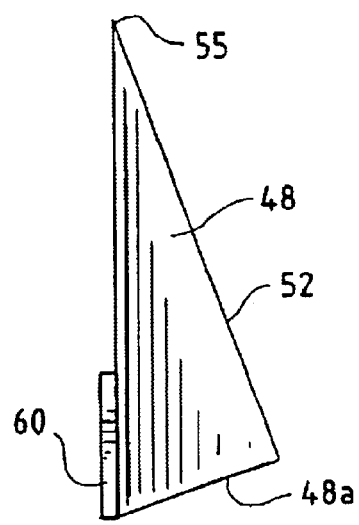
FIG. 6 is a side view of the fan blade of FIG. 4, from the right of FIG. 5.
Figure 7:
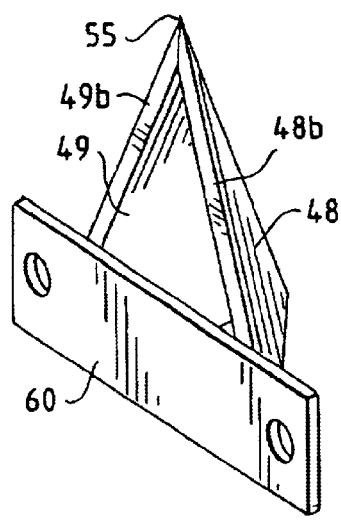
FIG. 7 is a perspective view of the fan blade of FIG. 4.
Figure 8:
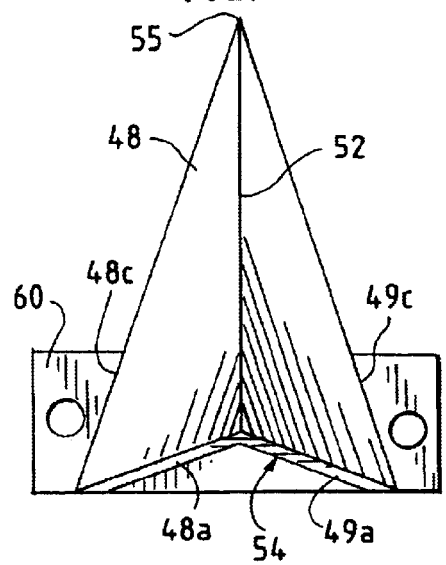
FIG. 8 is an axial view of the convex surface of the fan blade of FIG. 4.
Figure 9:
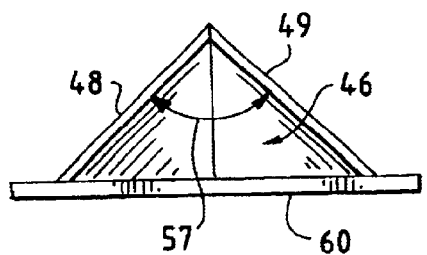
FIG. 9 is a radial view of the fan blade of FIG. 4 looking upwardly from below FIG. 8.

A preferred configuration for a discrete blade and mounting plate in accordance with the invention is shown in FIGS. 4–10. Blade 45 has a major axis which extends radially of rotor 24 and a minor axis which extends axially of the rotor with a concave surface facing axially of the rotor in one direction and a convex surface facing axially of the rotor in the other direction. In FIG. 4 the outer convex surface of the blade faces axially away from rotor 24. The inner concave surface (not seen in FIG. 4) faces axially toward rotor 24 and defines a radial duct 46, FIG. 9, for air flow radially outward from the rotor axis as indicated by arrow 47.

Blade 45 is preferably formed of two flat triangular panels 48, 49 joined along a common radial edge 52. Each panel has a base edge 48a, 49a facing the rotor axis and the base edges form an open base 54 of the triangular blade and an inlet of radial duct 46. The blade is tapered radially and axially outwardly from base 54 to tip 55. Panels 48, 49 form an axially directed angle 57, FIG. 9, of the order of 90°. The blade base 54 preferably has an angle of 20°–30° with respect to the axis of rotor shaft 25.

Panels 48, 49 have lateral edges 48b, 49b which define a plane substantially at a right angle to the axis of rotor shaft 25. A section of each lateral edge adjacent the base edge is joined with mounting plate 60 at joints 48c, 49c.

Figure 10:
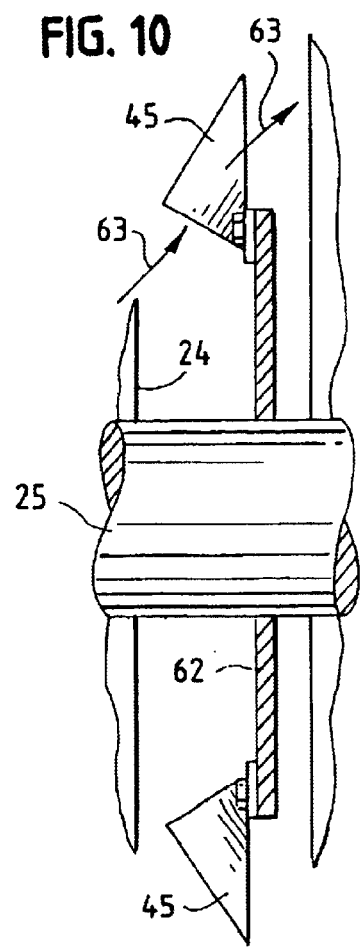
FIG. 10 is a fragmentary sectional view of an alternate mounting of the fan blade of FIG. 4.

The concave and convex surfaces of blade 45 may be reversed and the blades secured to a carrier 62, FIG. 10. Air is drawn past the stator (not shown) and rotor 24 and discharged from the machine as indicated by arrows 63.

It is preferred that the blade 45 and mounting plate 60 have a mechanical resonance at a multiple of the rotational speed of machine 10, the multiple being at least 5, to minimize mechanical failure. Thus, for a machine operating at 1700 rpm, mechanical resonance of the blade and mounting plate should be at a multiple greater than 140 Hz.

The blade 45 of FIGS. 4–10 has particularly good mechanical failure avoidance because its triangular structure is fatigue resistant. The radial duct-like configuration provides for efficient ventilation of the machine.

The unitary discrete fan blades described herein can be fabricated of sheet metal or injection molded of plastic.

The drawings show fans at one end of a machine. In a symmetrical machine construction, a fan is provided at each end. Alternatively, a fan at one end can cause air flow axially through the machine.

I claim:

1. In an electrical machine having a rotor with an axis of rotation and a stator surrounding said rotor, with an annular gap between the rotor and stator, a fan for directing air through the annular gap across said rotor and stator, comprising:

a plurality of discrete blades mounted for rotation with said rotor about said axis, each blade having a concave surface facing axially of the rotor in one direction and a convex surface facing axially of the rotor in the other direction, the concave blade surface defining a radial duct for air flow.

2. The fan of claim 1 in which the concave blades are tapered radially and axially outward with respect to the rotor from a blade base to a blade tip.

3. The fan of claim 2 in which each blade is comprised of two flat triangular panels joined along a common edge.

4. The fan of claim 3 in which said panels define an axially directed angle and the common edge is the vertex of the angle.

5. The fan of claim 4 in which said axially directed angle is of the order of 90°.

6. The fan of claim 3 in which each panel has a base edge facing the rotor axis and the base edges of the two panels define an open base of the blade.

7. The fan of claim 6 in which the blade base defines an acute angle with respect to the rotor axis.

8. The fan of claim 3 in which each of the triangular panels has a lateral edge, the lateral edges of the two panels defining a plane which is substantially at a right angle to the rotor axis.

9. The fan of claim 8 including a mounting plate for each blade, a section of the lateral edge adjacent the base edge of each triangular panel being joined with said mounting plate.

10. The fan of claim 9 in which each blade and mounting plate are unitary molded plastic.

11. The fan of claim 1 including a blade mounting plate for each blade secured to the concave surface of the blade and in which each blade and mounting plate are unitary molded plastic.

12. In an electrical machine having a rotor with an axis of rotation and a stator surrounding said rotor, with an annular gap between the rotor and stator, a fan for directing air through the annular gap across said rotor and stator, comprising:

a plurality of discrete blades mounted for rotation with said rotor about said axis, each blade having a concave surface facing axially of the rotor in one direction and a convex surface facing axially of the rotor in the other direction, the blades being tapered radially and axially outward with respect to the rotor from a blade base to a blade tip, each blade being comprised of two flat triangular panels joined along a common edge, each panel having a base edge facing the rotor axis and the base edges of the two panels define an open base of the blade and the blade base defining an acute angle of the order of 20°–30° with respect to the rotor axis.

13. In an electrical machine having a rotor with an axis of rotation and a stator surrounding said rotor, with an annular gap between the rotor and stator, a fan for directing air through the annular gap across said rotor and stator, comprising:

a plurality of discrete blades mounted for rotation with said rotor about said axis, each blade having a concave surface facing axially of the rotor in one direction and a convex surface facing axially of the rotor in the other direction, the blades being tapered radially and axially outward with respect to the rotor from a blade base to a blade tip, each blade being comprised of two flat triangular panels joined along a common edge, each of the triangular panels having a lateral edge, the lateral edges of the two panels defining a plane which is substantially at a right angle to the rotor axis; and a mounting plate for each blade, a section of the lateral edge adjacent the base edge of each triangular panel being joined with said mounting plate, the blade and mounting plate having a mechanical resonance at a frequency which is at least the fifth multiple of the rotational speed of the electrical machine.

14. In an electrical machine having a rotor with an axis of rotation and a stator surrounding said rotor, with an annular gap between the rotor and stator, a fan for directing air through the annular gap across said rotor and stator, comprising:

a plurality of discrete blades mounted for rotation with said rotor about said axis, each blade having a concave surface facing axially of the rotor in one direction and a convex surface facing axially of the rotor in the other direction; and a blade mounting plate for each blade, secured to the concave surface of the blade and in which each blade and mounting plate are unitary molded plastic, each blade and its mounting plate having a mechanical resonance at a frequency which is at least the fifth multiple of the rotational speed of the electrical machine.

* * * * *